United States Patent
DeCusatis et al.

(10) Patent No.: US 7,796,642 B2
(45) Date of Patent: *Sep. 14, 2010

(54) SYSTEM, METHOD, AND ARTICLE OF MANUFACTURE FOR INITIALIZING A COMMUNICATION LINK USING GFP DATA FRAMES

(75) Inventors: Casimer Maurice DeCusatis, Poughkeepsie, NY (US); Thomas A. Gregg, Highland, NY (US)

(73) Assignee: International Business Machines Corporation, Armonk, NY (US)

(*) Notice: Subject to any disclaimer, the term of this patent is extended or adjusted under 35 U.S.C. 154(b) by 397 days.

This patent is subject to a terminal disclaimer.

(21) Appl. No.: 11/868,084

(22) Filed: Oct. 5, 2007

(65) Prior Publication Data

US 2008/0019396 A1 Jan. 24, 2008

Related U.S. Application Data

(63) Continuation of application No. 11/046,115, filed on Jan. 28, 2005, now Pat. No. 7,321,600.

(51) Int. Cl.
*H04J 3/16* (2006.01)
(52) U.S. Cl. .................. 370/466; 370/389; 370/401
(58) Field of Classification Search .................. None
See application file for complete search history.

(56) References Cited

U.S. PATENT DOCUMENTS

| 6,545,691 | B1 | 4/2003 | Vallejo |
| 6,560,607 | B1 | 5/2003 | Lassesen |
| 6,816,509 | B2 | 11/2004 | Pelley et al. |
| 2002/0090007 | A1 | 7/2002 | Kamiya et al. |
| 2002/0176450 | A1 | 11/2002 | Kong et al. |
| 2003/0061375 | A1 | 3/2003 | Gregg et al. |
| 2003/0112833 | A1 | 6/2003 | Kamiya |
| 2004/0073717 | A1 | 4/2004 | Cline et al. |
| 2004/0085902 | A1 | 5/2004 | Miller et al. |
| 2004/0085904 | A1 | 5/2004 | Bordogna et al. |
| 2004/0100958 | A1 | 5/2004 | Peng |
| 2004/0105459 | A1 | 6/2004 | Mannam |
| 2004/0170128 | A1 | 9/2004 | Takamichi |
| 2004/0240428 | A1* | 12/2004 | Jiang ........................ 370/351 |
| 2004/0252720 | A1* | 12/2004 | Xiong et al. ................ 370/473 |
| 2005/0002338 | A1 | 1/2005 | Devdas et al. |

(Continued)

OTHER PUBLICATIONS

Cross-reference related U.S. Appl. No. 11/046,115, filed Jan. 28, 2005, entitled System, Method and Article of Manufacture for Initilizing A Communication Link Using GFP Data Frames.

*Primary Examiner*—Bob A Phunkulh
(74) *Attorney, Agent, or Firm*—Cantor Colburn LLP; Steven Chiu

(57) ABSTRACT

A system and a method for initializing a communication link for transmitting a data stream from a first computer through a synchronous optical communication network to a second computer are provided. The method includes transmitting a first request message in a first GFP data frame to a second computer. The method further includes transmitting a second acknowledgement message in a second GFP data frame from the second computer to the first computer. The method further includes initializing the communication link between the first computer and the second computer in response to the acknowledgement message.

18 Claims, 4 Drawing Sheets

U.S. PATENT DOCUMENTS

| | | |
|---|---|---|
| 2005/0010849 A1 | 1/2005 | Ryle et al. |
| 2005/0041695 A1 | 2/2005 | Bordogna et al. |
| 2005/0053064 A1 | 3/2005 | Wang |
| 2005/0078685 A1 | 4/2005 | MacLean et al. |
| 2005/0216783 A1 | 9/2005 | Sundaram et al. |
| 2006/0041826 A1 | 2/2006 | Bhattacharya et al. |
| 2006/0159112 A1* | 7/2006 | Sundaram et al. ............ 370/412 |
| 2007/0019653 A1* | 1/2007 | Bolle et al. ............. 370/395.51 |
| 2007/0165646 A1* | 7/2007 | He ........................ 370/395.4 |
| 2007/0258444 A1* | 11/2007 | He ............................. 370/389 |

* cited by examiner

SYSTEM, METHOD, AND ARTICLE OF MANUFACTURE FOR INITIALIZING A COMMUNICATION LINK USING GFP DATA FRAMES

CROSS REFERENCE TO RELATED APPLICATION

The application is a continuation application of U.S. patent application Ser. No. 11/046,115, filed Jan. 28, 2005, now U.S. Pat. No. 7,321,600, the contents of which are incorporated herein by reference thereto.

FIELD OF INVENTION

The invention relates to a system, method, and an article of manufacture for initializing a communication link using GFP data frames.

BACKGROUND OF INVENTION

The Generic Framing Procedure (GFP) is a communication standard that defines a procedure for encapsulating and delineating variable-length payloads from received data message for transporting the data messages over a synchronous optical communication network (SONET). Systems implementing the GFP communication standard, however, do not validate that a communication link has been established between first and second computers prior to sending data frames between the first and second computers. Accordingly, when the first computer initially transmits a data frame through the SONET communication network to a second computer and the second computer is not operable or not ready to receive the data frame, the data frame is not received and stored by the second computer.

Accordingly, there is a need for a system and a method for initializing a communication link through a synchronous optical communication network by validating that a downstream computer is ready to receive a data stream.

SUMMARY OF INVENTION

A method for initializing a communication link for transmitting a data stream from a first computer through a synchronous optical communication network to a second computer in accordance with an exemplary embodiment is provided. The method includes transmitting a first request message at a first time from the first computer to a first GFP data mapping device. The method further includes generating a first GFP data frame based on the first request message using the first GFP data mapping device that indicates that the communication link is being requested, and transmitting the first GFP data frame through the synchronous optical communication network to a second GFP demapping device. The method further includes decoding the first GFP data frame to obtain the first request message and transmitting the first request message from the second GFP demapping device to the second computer. The method further includes generating a second acknowledgement message using the second computer in response to the first request message and transmitting the first request message to a third GFP data mapping device. The method further includes generating a second GFP data frame based on the second acknowledgement message using the third GFP data mapping device and transmitting the second GFP data frame through the synchronous optical communication network to a fourth GFP demapping device. The method further includes decoding the second GFP data frame at a second time using the fourth GFP demapping device to obtain the second acknowledgement message. The method further includes initializing the communication link between the first computer and the second computer in response to the acknowledgement message.

A system for initializing a communication link through a synchronous optical communication network in accordance with another exemplary embodiment is provided. The system includes a first computer configured to generate a first request message at a first time. The system further includes a first GFP data mapping device configured to receive the first request message and to generate a first GFP data frame based on the first request message that indicates that the communication link is being requested. The first GFP data mapping device is further configured to transmit the first GFP data frame through the synchronous optical communication network. The system further includes a second GFP data mapping device configured to receive the first GFP data frame to decode the first GFP data frame to obtain the first request message. The system further includes a second computer configured to receive the first request message from the second GFP data mapping device and to generate a second acknowledgement message in response to the first request message. The system further includes a third GFP data mapping device configured to receive the second acknowledgement message and to generate a second GFP data frame based on the second acknowledgement message. The third GFP data mapping device is further configured to transmit the second GFP data frame through the synchronous optical communication network. The system further includes a fourth GFP data demapping device configured to receive the second GFP data frame and to decode the second GFP data frame at a second time to obtain the second acknowledgement message. The first GFP mapping device is further configured to initialize the communication link between the first computer and the second computer in response to the fourth GFP data demapping device receiving the second acknowledgement message.

An article of manufacture in accordance with another exemplary embodiment is provided. The article of manufacture includes a computer storage medium having a computer program encoded therein for initializing a communication link for transmitting a data stream from a first computer through a synchronous optical communication network to a second computer. The computer storage medium includes code for transmitting a first request message at a first time from the first computer to a first GFP data mapping device. The computer storage medium further includes code for generating a first GFP data frame based on the first request message using the first GFP data mapping device that indicates that the communication link is being requested, and transmitting the first GFP data frame through the synchronous optical communication network to a second GFP demapping device. The computer storage medium further includes code for decoding the first GFP data frame to obtain the first request message and transmitting the first request message from the second GFP demapping device to the second computer. The computer storage medium further includes code for generating a second acknowledgement message using the second computer in response to the first request message and transmitting the first request message to a third GFP data mapping device. The computer storage medium further includes code for generating a second GFP data frame based on the second acknowledgement message using the third GFP data mapping device and transmitting the second GFP data frame through the synchronous optical communication network to a fourth GFP demapping device. The computer storage medium further includes code for decoding the second GFP data frame at a second time using the fourth GFP demapping device to obtain the second acknowledgement message. The computer storage medium further includes code for initializing the communication link between the first computer and the second computer in response to the acknowledgement message.

A method for initializing a communication link for transmitting a data stream from a first computer through a synchronous optical communication network to a second computer in accordance with another exemplary embodiment is provided. The method includes transmitting a first request message at a first time from the first computer to a first GFP data mapping device. The method further includes generating a first GFP data frame based on the first request message using the first GFP data mapping device that indicates that the communication link is being requested, and transmitting the first GFP data frame through the synchronous optical communication network. The method further includes receiving a second GFP data frame at a first GFP data demapping device from the synchronous optical communication network. The second GFP data frame has a first acknowledgement message responsive to the first request message. The method further includes decoding the second GFP data frame at a second time utilizing the first GFP data demapping device to obtain the first acknowledgement message. The method further includes initializing the communication link between the first computer and the second computer in response to the first acknowledgement message.

A system for initializing a communication link through a synchronous optical communication network in accordance with another exemplary embodiment is provided. The system includes a first computer configured to transmit a first request message at a first time to a first GFP data mapping device. The first GFP data mapping device is configured to generate a first GFP data frame based on the first request message that indicates that the communication link is being requested, and to transmit the first GFP data frame through the synchronous optical communication network. The system further includes a first GFP data demapping device configured to receive a second GFP data frame from the synchronous optical communication network. The second GFP data frame has a first acknowledgement message responsive to the first request message. The first GFP data demapping device is further configured to decode the second GFP data frame at a second time to obtain the first acknowledgement message. The first GFP data mapping device is further configured to initialize the communication link between the first computer and a second computer in response to the first acknowledgement message.

An article of manufacture in accordance with another exemplary embodiment is provided. The article of manufacture includes a computer storage medium having a computer program encoded therein for initializing a communication link for transmitting a data stream from a first computer through a synchronous optical communication network to a second computer. The computer storage medium includes code for transmitting a first request message at a first time from the first computer to a first GFP data mapping device. The computer storage medium further includes code for generating a first GFP data frame based on the first request message using the first GFP data mapping device that indicates that the communication link is being requested, and transmitting the first GFP data frame through the synchronous optical communication network. The computer storage medium further includes code for receiving a second GFP data frame at a first GFP data demapping device from the synchronous optical communication network. The second GFP data frame has a first acknowledgement message responsive to the first request message. The computer storage medium further includes code for decoding the second GFP data frame at a second time utilizing the first GFP data demapping device to obtain the first acknowledgement message. The computer storage medium further includes code for initializing the communication link between the first computer and the second computer in response to the first acknowledgement message.

Other systems, methods and/or computer program products according to the embodiments will be or become apparent to one with skill in the art upon review of the following drawings and detailed description. It is intended that at all such additional systems, methods, and/or computer program products be within the scope of the present invention, and be protected by the accompanying claims.

DESCRIPTION OF AN EMBODIMENT

Figure 1:
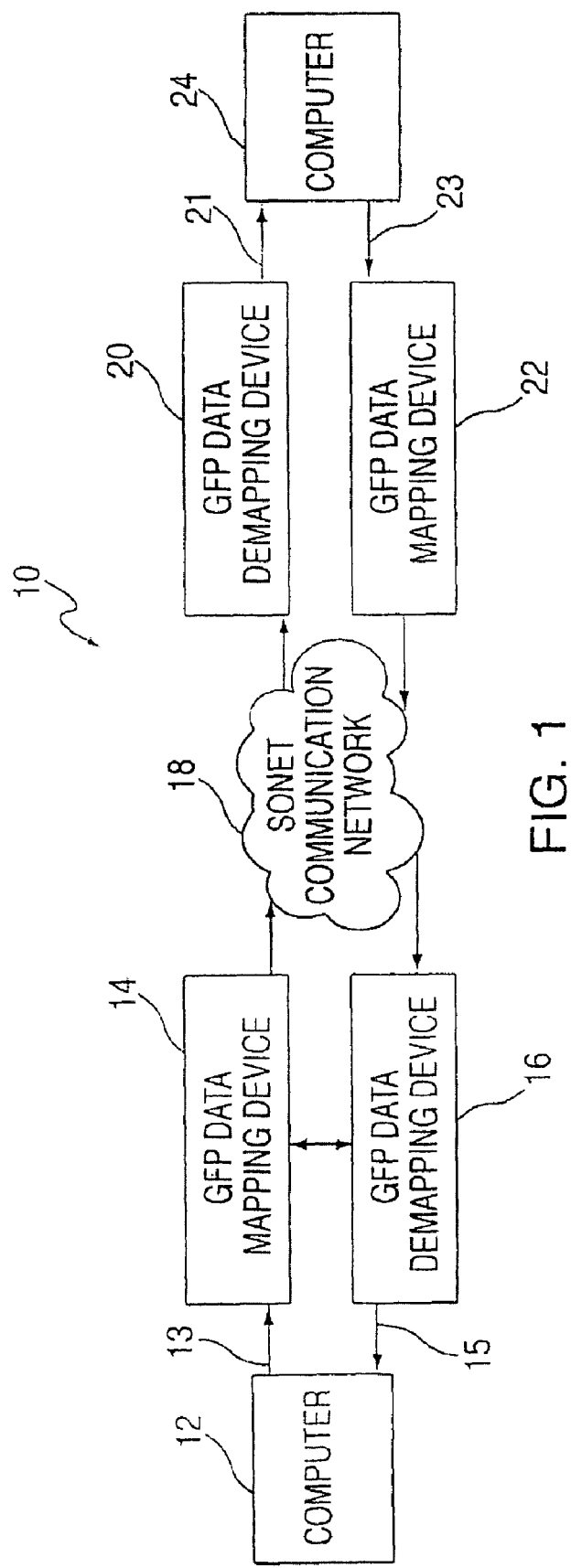
FIG. 1 is a block diagram of a communication system for initializing a communication link in accordance with an exemplary embodiment.

Referring to FIG. 1, a communication system 10 for initializing a communication link using GFP data frames is illustrated. In an exemplary embodiment, the communication system 10 utilizes an open fiber control methodology to obtain a communication link that provides an exclusive communication connection for a duration of a session between computers 12, 24. Further, the communication link comprises a Class 1 communication link, in an exemplary embodiment. The open fiber control methodology is a handshaking protocol that is used to verify that duplex fiber optic cables are properly connected to the computers 12, 24, respectively, prior to transmitting data between the computers 12, 24. Of course, the methodology described below could also be utilized with other systems that utilize transmission means other than fiber optic cables. The system 10 includes a computer 12, fiber optic cables 13, 15, a GFP data mapping device 14, a GFP data demapping device 16, a SONET communication network 18, a GFP data demapping device 20, a GFP data mapping device 22, fiber optic cables 21, 23, and a computer 24.

The computer 12 is provided to generate a request message at a first time that requests a communication link be initialized between the computer 12 and the computer 24 prior to sending a data stream therebetween. The request message is communicated through the fiber optic cable 13, the GFP data mapping device 14, the SONET communication network 18, the fiber optic cable 21, and the GFP data demapping device 20 to the computer 24. As shown, the computer 12 operably communicates with: (i) the GFP data mapping device 14 via the fiber optic cable 13, and (ii) the GFP data demapping device 16 via the fiber optic cable 15.

Figure 2:
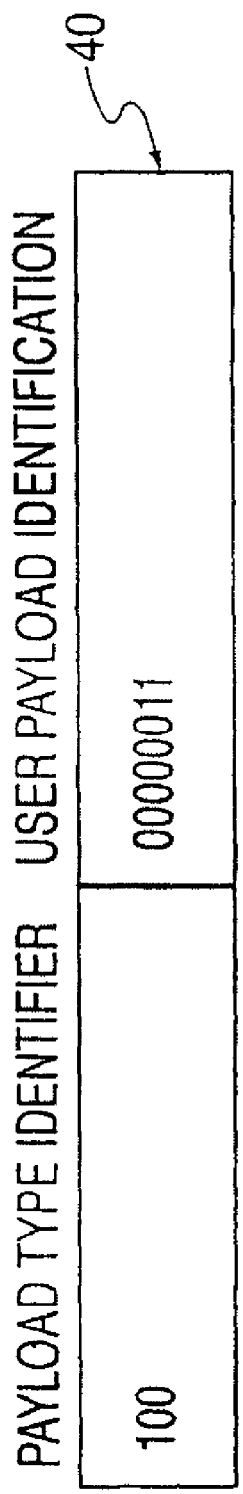
FIG. 2 is a block diagram of a GFP data frame having a request message.

Referring to FIGS. 1 and 2, the GFP data mapping device 14 is provided to receive the request message and to generate a GFP data frame 40 based on the request message that indicates a communication link is being requested. The GFP data mapping device 14 is further configured to transmit the GFP data frame 40 through the SONET communication network 18 to the GFP data demapping device 20. The GFP data frame 40 includes a payload type identifier and a user payload identification value. In particular, the payload type identifier is specified by the bit sequence "100" and the user payload identification value is specified as the bit sequence "00000011". The GFP data mapping device 14 is further configured to send a first acknowledgment message to the computer 12 in response to the request message. In an alternate embodiment, the GFP data mapping device 14 and the GFP data demapping device 16 can comprise one device having a data mapping module and a data demapping module, respectively.

The SONET communication network 18 is provided to transmit GFP frames from the GFP data mapping device 14 to the GFP data demapping device 20. Further, the SONET communication network 18 is provided to transmit GFP frames from the GFP data mapping device 22 to the GFP data demapping device 16.

Figure 3:
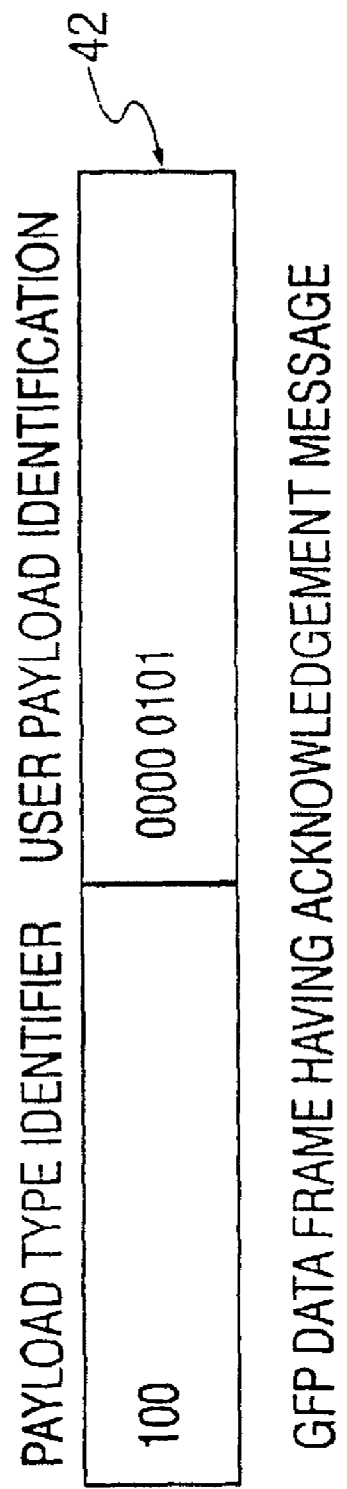
FIG. 3 is a block diagram of a GFP data frame having an acknowledgment message.

Referring to FIGS. 1 and 3, the GFP data demapping device 20 is provided to decode the GFP data frame 40 to obtain the request message and to transmit the request message to the computer 24. The GFP data demapping device 20 operably communicates with the SONET communication network 18, and to the computer 24 via the fiber optic cable 21.

The computer 24 is provided to receive the request message and to generate a second acknowledgment message in response to the request message. The computer 24 is further configured to transmit the second acknowledgment message to the GFP data mapping device 22. As shown, the computer 24 is operably coupled to: (i) the GFP data demapping device 20 via the fiber optic cable 21, and (ii) the GFP data mapping device 22 via the fiber optic cable 23.

Referring to FIGS. 1 and 2, the GFP data mapping device 22 is provided to receive the acknowledgment message from the computer 24 and to generate a GFP data frame 42 based on the second acknowledgment message that indicates that the computer 24 is ready to receive data from the computer 12. The GFP data mapping device 22 is further configured to transmit the GFP data frame 42 through the SONET communication network 18 to the GFP data demapping device 16. The GFP data frame 42 includes a payload type identifier and a user payload identification value. In particular, the payload type identifier is specified by the bit sequence "100" and the user payload identification value is specified as the bit sequence "00000101". In an alternate embodiment, the GFP data mapping device 22 and the GFP data demapping device 20 can comprise one device having a data mapping module and a data demapping module, respectively.

Referring to FIG. 1, the GFP data demapping device 16 is provided to decode the GFP data frame 40 at a second time to obtain the second acknowledgment message and to transmit the second acknowledgment message to the computer 12. The GFP data mapping device 14 is configured to transmit data from the computer 12 through the SONET communication network 18 to the computer 24, when a time difference between a first time when the request message was transmitted from the computer 12 and a second time when the GFP data frame 40 is received by the device 16, is less than a threshold time interval.

Figure 4:
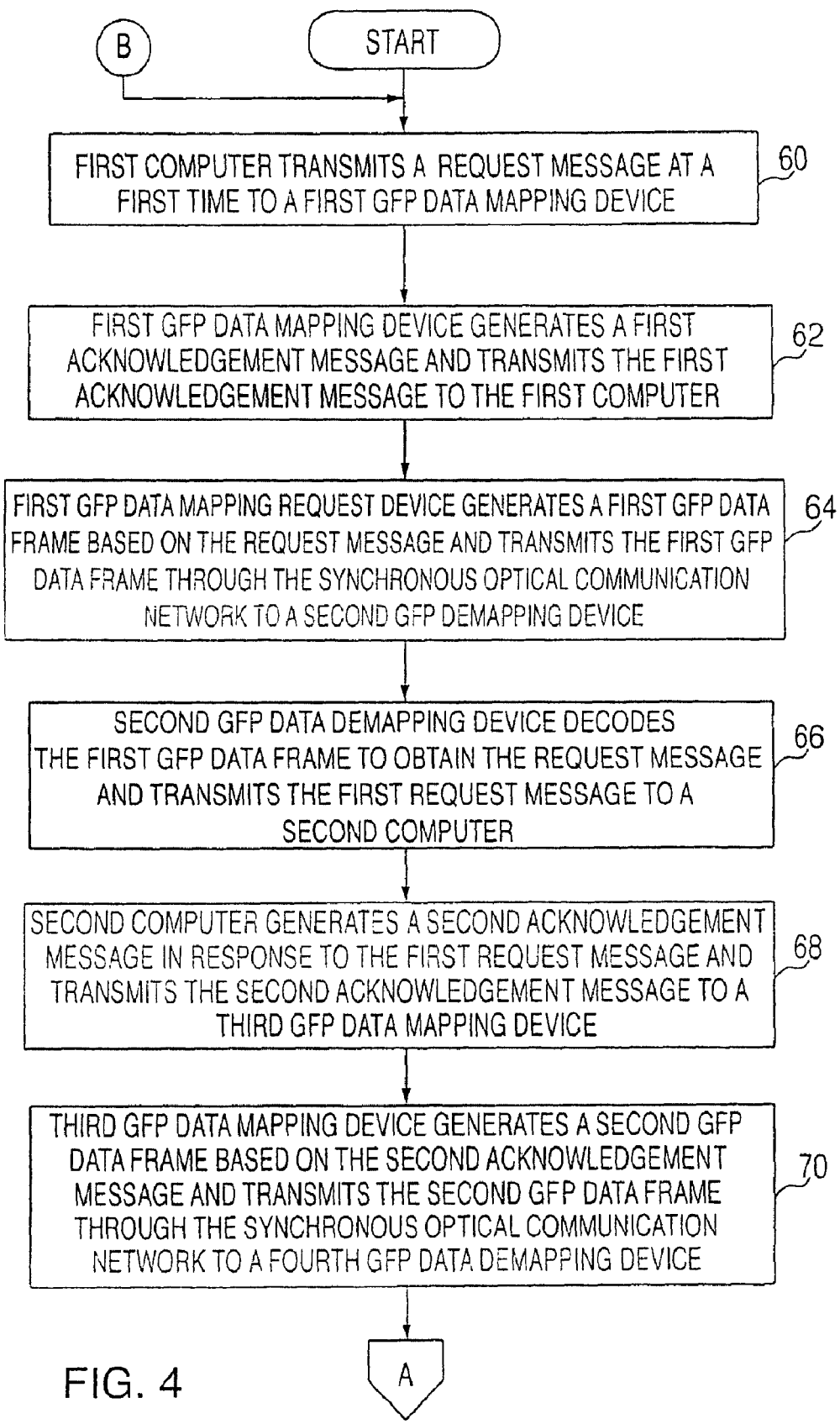
FIGS. 4-5 are flowcharts of a method for initializing a communication link in accordance with another exemplary embodiment.
Figure 5:
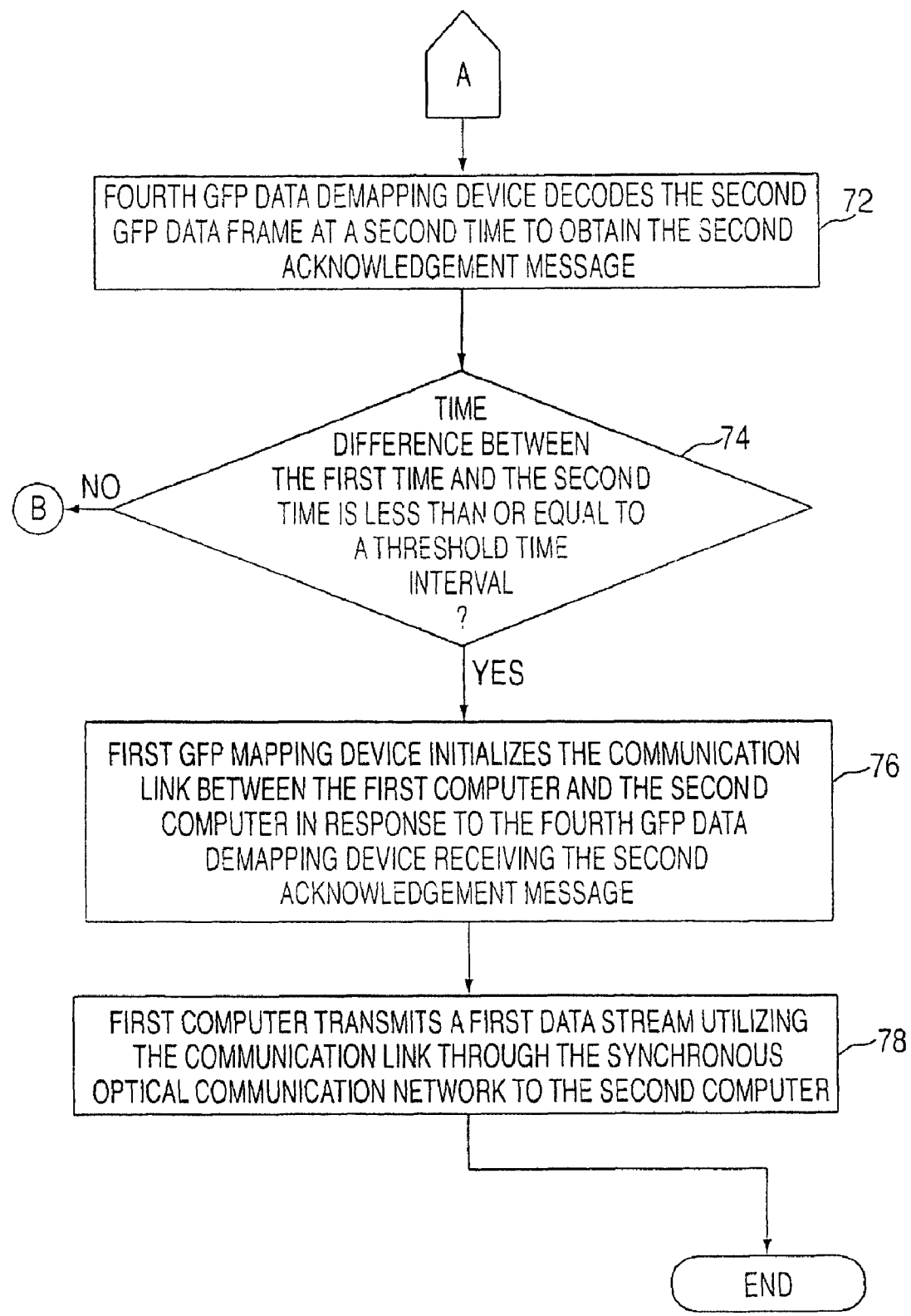

Referring to FIGS. 4-5, a method for initializing a communication link between the computer 12 and the computer 24 will now be explained. The method is implemented utilizing the system 10.

At step 60, the computer 12 transmits a request message at a first time to the GFP data mapping device 14.

At step 62, the GFP data mapping device 14 generates a first acknowledgement message and transmits the first acknowledgment message to the computer 12. Further, the device 14 starts a timer (not shown) therein.

At step 64, the GFP data mapping device 14 generates a GFP data frame 40 based on the request message and transmits the GFP data frame 40 through the SONET communication network 18 to the GFP demapping device 20.

At step 66, the GFP data demapping device 20 decodes the GFP data frame 40 to obtain the request message and transmits the request message to the computer 24.

At step 68, the computer 24 generates a second acknowledgement message in response to the request message and transmits the second acknowledgement message to the GFP data mapping device 22.

At step 70, the GFP data mapping device 22 generates a GFP data frame 42 based on the second acknowledgement message and transmits the GFP data frame 42 through the SONET communication network to the GFP data demapping device 16.

At step 72, the GFP data demapping device 16 decodes the GFP data frame 42 at a second time to obtain the second acknowledgement message.

At step 74, the GFP data demapping device 16 makes determination as to whether a time difference between the first time and the second time is less than or equal to a threshold time interval. The device 16 determines the time difference by obtaining a time value from the timer (not shown) therein. If the value of step 74 equals "yes", the method advances to step 76. Otherwise, the timer is reset and the method advances to step 60.

At step 76, the GFP data mapping device 14 initializes the communication link between the computer 12 and the computer 24 in response to the GFP data demapping device 16 receiving the second acknowledgement message.

At step 78, the computer 12 transmits a first data stream utilizing the communication link through the SONET communication network to the computer 24. After step 78, the method is exited.

The system and the method for initializing a communication link for transmitting a data stream from a first computer through a SONET communication network to a second computer provide a substantial advantage over other systems and methods. In particular, the system and the method provide a technical effect of transmitting a request message and an acknowledgment message to validate that the second computer is ready to receive a data stream.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

We claim:

1. A method for initializing a communication link for transmitting a data stream from a first computer through a synchronous optical communication network to a second computer, comprising:
   transmitting a first request message at a first time from the first computer to a first GFP data mapping device;
   generating a first GFP data frame based on the first request message using the first GFP data mapping device that indicates that the communication link is being requested, and transmitting the first GFP data frame through the synchronous optical communication network;
   receiving a second GFP data frame at a first GFP data demapping device from the synchronous optical communication network, the second GFP data frame having a first acknowledgement message responsive to the first request message;
   decoding the second GFP data frame at a second time utilizing the first GFP data demapping device to obtain the first acknowledgement message; and
   initializing the communication link between the first computer and the second computer in response to the first acknowledgement message.

2. The method of claim 1, wherein the step of initializing the communication link between the first computer and the second computer in response to the first acknowledgement message comprises:
   selecting an exclusive communication link using the first GFP data mapping device for communicating the data stream from the first computer through the synchronous optical communication network to the second computer.

3. The method of claim 1, wherein the step of initializing the communication link between the first computer and the second computer occurs when a time difference between the first time and the second time is less than or equal to a threshold time interval.

4. The method of claim 1, further comprising transmitting a first data stream from the first computer through the synchronous optical communication network to the second computer, in response to the initialization of the communication link.

5. The method of claim 4, wherein the first data stream comprises an ISC data stream.

6. The method of claim 1, further comprising:
   receiving a third GFP data frame at the first GFP data demapping device from the synchronous optical communication network, the third GFP data frame having a second acknowledgement message responsive to the first request message; and
   decoding the third GFP data frame at a third time utilizing the first GFP data demapping device to obtain the second acknowledgement message.

7. The method of claim 6, further comprising stopping data communication between the first computer and the first GFP data mapping device when a time difference between the first time and the third time is greater than a threshold time period.

8. A system for initializing a communication link through a synchronous optical communication network, comprising:
   a first computer configured to transmit a first request message at a first time to a first GFP data mapping device;
   the first GFP data mapping device configured to generate a first GFP data frame based on the first request message that indicates that the communication link is being requested, and to transmit the first GFP data frame through the synchronous optical communication network;
   a first GFP data demapping device configured to receive a second GFP data frame from the synchronous optical communication network, the second GFP data frame having a first acknowledgement message responsive to the first request message;
   the first GFP data demapping device further configured to decode the second GFP data frame at a second time to obtain the first acknowledgement message; and
   the first GFP data mapping device further configured to initialize the communication link between the first computer and a second computer in response to the first acknowledgement message.

9. The system of claim 8, wherein the first GFP mapping device is configured to initialize the communication link between the first computer and the second computer by selecting an exclusive communication link from the first computer through the synchronous optical communication network to the second computer.

10. The system of claim 8, wherein the initialization of the communication link between the first computer and the second computer occurs when a time difference between the first time and the second time is less than or equal to a threshold time interval.

11. The system of claim 8, wherein the first computer is further configured to transmit a first data stream through the synchronous optical communication network to the second computer, in response to the initialization of the communication link.

12. The system of claim 11, wherein the first data stream comprises an ISC data stream.

13. The system of claim 8, wherein the first GFP data demapping device is further configured to receive a third GFP data frame from the synchronous optical communication network, the third GFP data frame having a second acknowledgement message responsive to the first request message, and the first GFP data demapping device further configured to decode the third GFP data frame at a third time to obtain the second acknowledgement message.

14. The system of claim 13, wherein the first GFP data mapping device is further configured to stop data communication between the first GFP data mapping device and the first computer when a time difference between the first time and the third time is greater than a threshold time period.

15. An article of manufacture, comprising:
   a non-transitory computer storage medium having a computer program encoded therein for initializing a communication link for transmitting a data stream from a first computer through a synchronous optical communication network to a second computer, the computer storage medium including:
   code for transmitting a first request message at a first time from the first computer to a first GFP data mapping device;
   code for generating a first GFP data frame based on the first request message using the first GFP data mapping device that indicates that the communication link is being requested, and transmitting the first GFP data frame through the synchronous optical communication network;
   code for receiving a second GFP data frame at a first GFP data demapping device from the synchronous optical communication network, the second GFP data frame having a first acknowledgement message responsive to the first request message; code for decoding the second GFP data frame at a second time utilizing the first GFP data demapping device to obtain the first acknowledgement message; and code for initializing the communication link between the first computer and the second computer in response to the first acknowledgement message.

16. The article of manufacture of claim 15, wherein the code for initializing the communication link between the first computer and the second computer in response to the first acknowledgement message comprises:

code for selecting an exclusive communication link using the first GFP data mapping device for communicating the data stream from the first computer through the synchronous optical communication network to the second computer.

17. The article of manufacture of claim 15, wherein the code for initializing the communication link between the first computer and the second computer is executed when a time difference between the first time and the second time is less than or equal to a threshold time interval.

18. The article of manufacture of claim 15, wherein the computer storage medium further comprises code for transmitting a first data stream from the first computer through the synchronous optical communication network to the second computer, in response to the initialization of the communication link.

* * * * *